United States Patent [19]

Burch et al.

[11] 3,916,195

[45] Oct. 28, 1975

[54] NON-DISPERSIVE MULTIPLE GAS ANALYZER

[75] Inventors: Darrell E. Burch, Orange City; John D. Pembrook, Costa Mesa, both of Calif.

[73] Assignee: Philco-Ford Corporation (Now Aeronutronic Ford Corporation), Blue Bell, Pa.

[22] Filed: June 17, 1974

[21] Appl. No.: 479,859

[52] U.S. Cl. ................ 250/345; 250/350; 250/510; 356/51
[51] Int. Cl.² ........................................ G01N 21/34
[58] Field of Search .......... 250/343, 345, 349, 350, 250/351, 510; 356/51

[56] References Cited
UNITED STATES PATENTS

| | | | |
|---|---|---|---|
| 3,793,525 | 2/1974 | Burch et al. | 250/343 |
| 3,851,176 | 11/1974 | Jeunehomme et al. | 250/343 |

Primary Examiner—James W. Lawrence
Assistant Examiner—T. N. Grigsby
Attorney, Agent, or Firm—R. D. Sanborn

[57] ABSTRACT

A gas analyzer for measuring separately the quantities of two or more gas species present in a sample. The analyzer uses a rotating gas cell having a pair of chambers which are alternately inserted into a beam of radiant energy. At least one chamber contains a quantity of each of the gas species to be analyzed at suitable pressures. After passing through the rotating gas cell, the radiant energy is passed through the sample region and is then split into two or more beams by suitable optics. Each beam is passed through a band pass filter and sensed by a photodetector. Thus there will be a photodetector for each gas species to be measured and the associated filter is designed to have a bandpass that will admit radiant energy over a spectral region where the gas species displays suitable absorption lines. The electrical output from each photodetector can be analyzed electronically and related to the quantity of a particular gas species in the sample.

10 Claims, 2 Drawing Figures

NON-DISPERSIVE MULTIPLE GAS ANALYZER

BACKGROUND OF THE INVENTION

The basic measurement concept is shown in U.S. Pat. NO. 3,793,525 which was issued on Feb. 19, 1974, to Darrell E. Burch, David A. Gryvnak, and John D. Pembrook. The details of a gas analyzer using an improved rotating gas selector cell are shown in copending application Ser. No. 476,373 filed on Jun 5, 1974, by Darrell E. Burch, John D. Pembrook, and Francis J. Gates. These references show how a rotating gas cell can be used in a non-dispersive radiant energy system to analyze a gas species in a sample region that can also contain interfering gas species. Thus a sensitive, rugged, single radiant energy beam device can be employed in the presence of substantial quantities of material that would be extremely troublesome to conventional instruments. U.S. Pat. No. 3,813,146 was issued on May 28, 1974, to John D. Pembrook, David A. Gryvnak, Darrell E. Burch, and Francis J. Gates. In this patent fixed gas cell chambers are alternately illuminated by a radiant energy beam in a device using a single rotating mirror. This can be used in place of the rotating gas cell structure. Typically the above devices are used to measure a single gas species. In the prior art, when a number of gas species are to be measured simultaneously and independently, a separate instrument for each is incorporated into a system. This has proven to be a cumbersome and expensive approach to the problem.

SUMMARY OF THE INVENTION

It is an object of the invention to employ a single non-dispersive gas analyzer to evaluate a plurality of gas species in a sample.

It is a further object to employ a rotating gas cell containing a plurality of gas species in a non-dispersive gas analyzer and to divert the radiant energy associated with the absorption of each gas species to a separate photodetector so that the output of each photodetector can be processed electronically to produce an electrical value that is directly related to the quantity of the gas species to be detected by that photodetector.

These and other objects can be achieved in a system constructed as follows. A rotating gas cell has two optically transparent chambers that can be alternately introduced into a beam of radiant energy by rotation. Each chamber has a quantity of the gas species to be detected at a suitable pressure and may contain two or more gas species. The chambers on opposing sides of the cell are filled to different gas pressure valves, the pressures being selected so that sharp absorption lines are present on one side whereas pressure broadened absorption lines are present on the other side. The gas quantity values on each side are adjusted to give the desired absorption characteristics. Alternatively the gas in the high pressure, i.e. broadened line spectrum, side can be replaced with a vacuum or a non absorbing gas in combination with a neutral density filter or attenuator. This attenuator is made to have a transmission that is equal to the average transmission of the gas filled chamber over the wavelengths of interest. The radiant energy beam source is made sufficiently broadband to include the desired absorption ranges of the various gas species being measured. After the beam is transmitted through the rotating selector cell, it is passed through the sample region wherein the measurement of gas concentration is to be made. The beam is then split into several bands according to wavelength, each waveband being selected to embrace a well defined absorption region of a particular gas species. Thus the beam will be split into one waveband channel for each gas species to be measured. Each channel is supplied with a separate photodetector which converts the radiant energy into an electrical signal. Each photodetector has its output electronically treated to give a readout in terms of the quantity of associated gas species in the sample.

The gas-filled selector cell can rotate at 1800 rpm, which has the effect of switching the optical path between the two chambers at 30 Hz. In addition, the energy can be chopped at 360 HZ by a chopper having opaque blades deposited on one window of the rotating selector cell. When no sample gas is present, and a 12-bladed chopper is employed, each photodetector output consists of a 360 Hz carrier signal due to the 360 Hz chopper. When the sample contains gases of the same species as those in the selector cell, each photodetector output consists of a 360 Hz carrier modulated at 30 Hz. The amount of 30 Hz modulation is proportional to the concentration and pressure of the detected gas present within the sample. 30 Hz modulation of the carrier occurs only when the sample gas absorbs energy within the system's spectral bandpass. Further, for modulation to occur, the absorption must correlate to some extent with the absorption characteristics of the gas within the gas selector cell. Placing a neutral attenuator within the sample cell would not cause 30 Hz modulation since both halves of the selector cell cycle would be affected equally. Accordingly the measurement is not affected by source brightness variation or changes in optical transmissivity.

DESCRIPTION OF THE INVENTION

Figure 1:
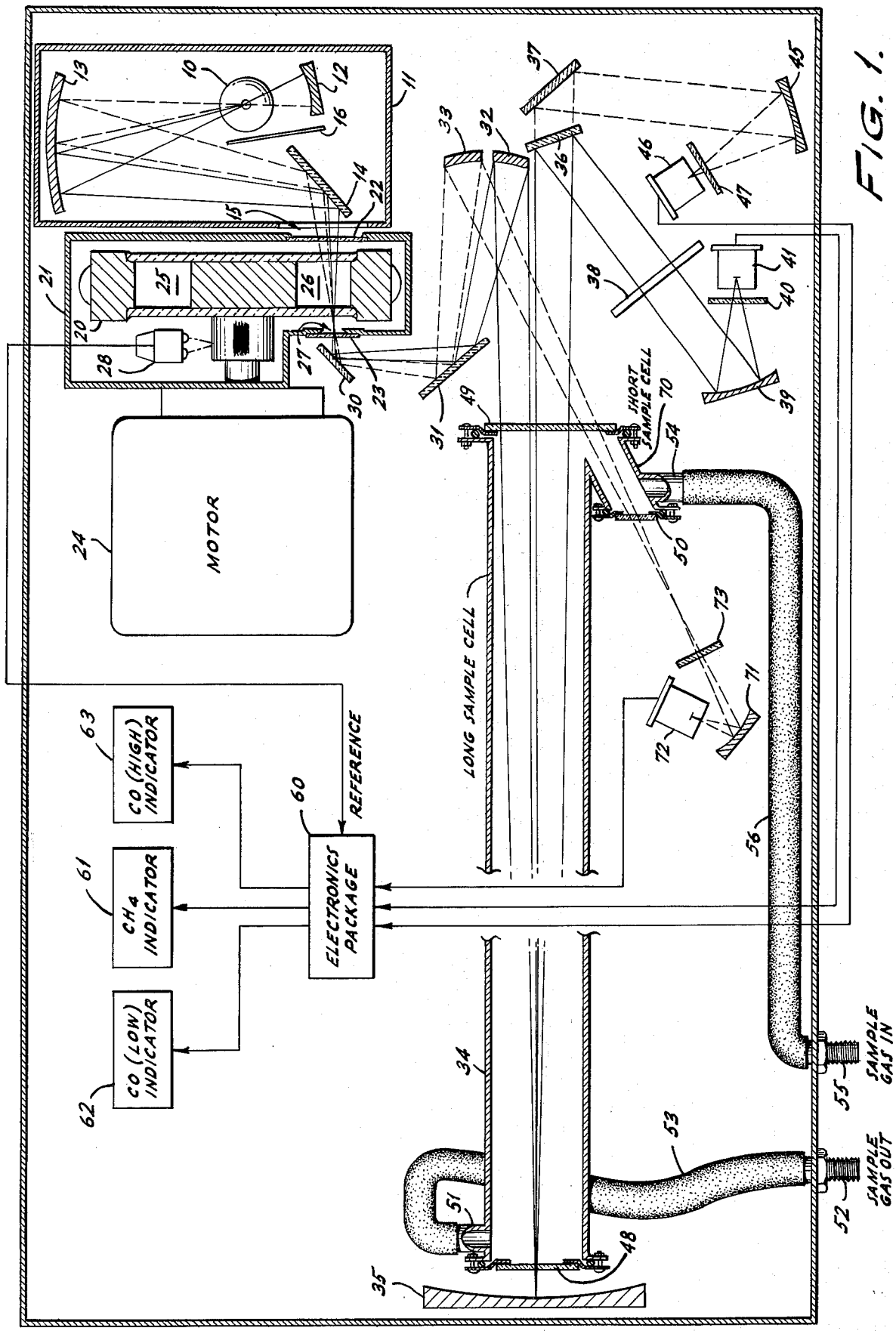
FIG. 1 shows the preferred embodiment of an analyzer for detecting the presence of two selected gas species wherein one gas can be analyzed in terms of two substantially different sample region lengths, and therefore two substantially different gas concentrations.

The instruments in the drawing are designed to measure the concentration of two gases simultaneously in a single sample region. In addition, in FIG. 1 one gas can be measured over two concentration ranges by employing two different length optical paths simultaneously. Signal separation is achieved optically and an electronics system processes electrical signals from the respective photodetectors to actuate suitable readout devices. While the principles embodied in the instrument can be applied to a number of gas species, the simultaneous measurement of carbon monoxide (CO), over two concentration ranges, and methane ($CH_4$) will be shown in detail.

The basic measurement, as described in detail in U.S. Pat. Nos. 3,793,525 and 3,813,146, involves forming a beam of radiant energy which is alternately passed through a quantity of the gas species to be measured at different concentration and pressure values. The beam is also chopped at a frequency substantially higher than the alternation rate. The beam is then passed through a sample region in which the gas measurement is to be made and then is converted to an electrical signal by means of a photodetector. Modulation is imposed upon the beam at the alternation frequency if the sample region contains gas of the same species as the gas within the selector cell. Typically a filter is located in front of the photodetector to confine the measurement to that portion of the radiant energy spectrum where the gas species to be measured displays the desired absorption characteristics. The photodetector output is fed to an electronics package that processes the electrical signal to produce an output representative of the gas species concentration in the sample. The output indicator, which can be a simple electrical meter, can be calibrated in terms of gas quantity.

The measurement instrument shown in FIG. 1 operates in the following manner. Radiant energy source 10 is mounted inside lamp box 11. The box 11 is desirably isolated thermally from the instrument and provided with cooling fins (not shown). For the gases to be measured an efficient source was found to be a conventional quartz-iodide lamp. The single coil tungsten filament, which is rated at 8 volts, is operated at 5 volts. This level of excitation provides adequate infra red output, reduced source heating, and extended lamp life. Mirror 12 increases the source efficiency by reimaging the filament upon itself. This also has the effect of filling in some of the space in between the filament coils as seen by mirror 13. The illumination from focusing mirror 13 is directed by flat mirror 14 through exit aperture 15 from light box 11. Baffle 16 is present to prevent aperture 15 from being illuminated directly by the lamp 10 filament.

Selector 20 is contained inside dust shield 21 which is made light tight except for entrance window 22 and exit window 23. Windows 22 and 23 are desirably antireflection coated sapphire. Shield 21 mounts on the baseplate of the instrument and the frame of motor 24 and is designed to act as a dust barrier between cell 20 and the ambient atmosphere. This protects cell 20 from accident and inadvertent handling and helps to keep its window surfaces free of contamination. Selector cell 20 is desirably constructed and operated as taught in above-mentioned application Ser. No. 476,373 filed June 5, 1974. It is attached to the shaft of motor 24 and is rotated at a rate of 1800 r.p.m. This causes chambers 25 and 26 to be alternately inserted at a 30 Hz rate into the optical beam passing through windows 22 and 23. The components in light box 11 and, in particular, mirror 13 are adjusted so that the filament of source 10 is focused on aperture 27. This aperture is made slightly smaller than the focused image of the filament of source 10, so that radiant energy emerges relatively uniformly across the aperture. Thus aperture 27 is a limiting aperture that assures a well defined beam in the remainder of the optical system.

While not shown, selector cell 20 may include a 12-blade chopper which interrupts transmission at a 360 Hz rate, as described in the above-identified patent and copending application. As also described in the above-mentioned disclosures, the average transmittances of selector cell chambers 25 and 26 are made equal over each of the spectral passbands of the instrument. Thus the radiant energy exiting from window 23 is chopped at a basic 360 Hz rate but does not contain a significant amount of 30 Hz modulation.

Shield 21 also contains a reference generator 28 which produces an electrical output related to motor shaft rotation. In its preferred form this generator includes a luminescent diode source and photodetector combination that produces a pulse out each time a black painted sector on the motor shaft passes by. Thus it produces a 30 Hz reference signal at exactly the motor rotation rate and of a fixed (selected) phase relationship. This signal is to be used in the electronic signal processing apparatus as will be described below.

Flat mirrors 30 and 31 direct the radiant energy from window 23 onto mirrors 32 and 33. Focusing mirror 32 is oriented to direct a portion of the radiant energy through the long sample cell 34 and to focus aperture 27 onto the surface of mirror 35 as shown by the solid optical path lines. Spherical mirror 35 is adjusted with its axis parallel to the axis of cell 34 so that when the beam from mirror 32 is reflected back down cell 34 it emerges slightly offset to impinge on reflectors 36 and 37. The radius of curvature of mirror 35 is selected such that an image of mirror 32 is formed on reflector 36.

Sample cell 34 is a metal tube having flanged ends to accommodate demountable windows 48 and 49. The windows, which are desirably antireflection coated sapphire, are sealed to apertured plates which are bolted to the cell flanges, using o-rings to provide gas tight seals. This construction permits easy window removal for cleaning. Window 50 is constructed in the same manner and closes short sample cell 70 which will be described below. Thus the sample cell is completely closed except for inlet and outlet connections which are described below. The apertured plates containing the windows for both cells 34 and 70 are made such that the metal of the plate is in contact with the metal of the cell body when the bolts are tightened. This assures a constant and known sample cell length. The sample cell is rigidly mounted on the instrument base plate at the end near window 49. A resilient mounting (not shown) supports the sample cell at the end near window 48. Gas entrance port 54 is connected to a sample gas inlet 55 by way of flexible hose 56. Gas exit port 51 is connected to a sample gas outlet 52 by way of flexible hose 53. The gas flow is desirably directed first through the short sample cell and then through the long sample cell so that abrupt changes in gas concentration can be observed in the short sample cell before mixing can occur in the long sample cell.

The entrance port 54 and exit port 51 are located with respect to the sample cells so that gas flow in these port regions is substantially parallel to the windows. This construction helps to keep the windows clean and free of entrained particulate matter. In the main sample regions the gas flow is essentially laminar and parallel to the radiant energy flux. Measurement accuracy is improved if excessively turbulent gas flow is avoided.

The inlet and outlet fittings 55 and 52 can be connected to any desired gas source and flow control means. The system will operate at any pressure from vacuum to at least one atmosphere. If desired, the sample cell and gas lines can be heated and insulated from the remainder of the system. Heating the gas handling system can prevent the condensation of water in the cell and on the cell windows. This can be a desirable feature when the gases being analyzed result from combustion processes.

After the radiant energy exits from sample cell 34 it impinges on reflector 36 which is a dichroic device designed to pass radiant energy at one wavelength and to reflect radiant energy at another wavelength. The energy reflected from reflector 36 passes through filter 38 and is focused by mirror 39 onto photodetector 41 through filter 40. Although dichroic reflector 36 could be replaced with a simple, non wavelength sensitive, beamsplitter, the optical efficiency of the dual wavelength system would be substantially reduced.

The radiant energy at the wavelength that passes through reflector 36 impinges on mirror 37 and is directed to mirror 45 which focuses it on photodetector 46 through filter 47.

In operation selector cell 20 is filled with two different gas species that display absorption spectra at two separated wavelengths It is only necessary that each gas be transparent where the other gas is being measured. Dichroic reflector 36 acts as a beam splitter to direct the radiant energy associated with the absorption of the two gases to two separate photodetectors. Filter 47 selectively passes a portion of the radiant energy that passes through reflector 36 and is constructed to select that wavelength associated with the absorption spectra of one gas in cell 20. Filter 40 selectively passes at least a portion of the energy reflected from reflector 36 and is constructed to select that wavelength associated with the absorption spectra of the other gas in cell 20. Filter 38 is a narrow band interference filter tuned precisely to a selected portion of the passband of filter 40. Filter 38 acts to reduce the effect of interfering gases in the sample. The output of the two photodetectors 41 and 46 will contain modulation products related to the amount of their corresponding gas species in sample cell 34. The photodetectors are connected to an electronics package 60 which processes the signals to produce outputs that can be calibrated in terms of the quantities of the gas species in cell 34. Typically electronics package 60 will include suitable 360 Hz and 30 Hz demodulators and associated amplifiers as described in detail in U.S. Pat. No. 3,793,525. Reference pickup 28 delivers a 30 Hz signal to the electronics package 60 so that the modulation signals from the photodetectors can be synchronously demodulated. The processed output of photodetector 41 appears on indicator 61 and the processed output of photodetector 46 appears on indicator 62.

An additional gas detection section has been included to operate in conjunction with the system associated with detector 46. Clearly the gas detection sensitivity is a function of the length of the measurement sample. In the system shown using cell 34, the effective sample length is doubled by the two-pass optical system. The length of cell 34 is made sufficient to provide an acceptable sensitivity or threshold. If the concentration of the gas species to be detected is too great, the sample will become essentially opaque at the absorption wavelength and a maximum measurable concentration limit will be encountered. Thus for very high gas species concentrations, a shorter sample length would be needed.

Short sample cell 70 provides a measurement device for high gas concentrations. Focusing mirror 33 is adjusted to direct radiant energy from aperture 27 through cell 70 and, as shown by the dashed lines, it produces an image of aperature 27 at the focus of mirror 71 which focuses the radiant energy onto photodetector 72. Filter 73 has a passband that is the same as that of filter 47. Thus the signal from photodetector 72 will, after processing in package 60, actuate indicator 63 which reads the high concentration range lying above the readings afforded by indicator 62.

In the above device it is shown how a single system, using a rotating gas cell, of the kind described in U.S. Pat. No. 3,793,525, can operate to detect two different gas species simultaneously. Clearly, by employing additional dichroic reflectors, additional wavelength detection systems could be accommodated so that three or even more gases could be detected simultaneously. It is only necessary that each gas be transparent at the absorption wavelengths where the other gases are being measured. Also, while means for detecting a particular gas species at two different concentration ranges have been shown, still more ranges could be accommodated by using other different lengths of sample cells. If greater sensitivity is desired, a multiple pass sample cell could be used with suitable optics to provide four or more passes. If extended response to higher concentrations is desired, additional shorter sample cells could be employed. Further, although the device shown in FIG. 1 uses reflective optics throughout, some space can be saved by using transmissive optics in certain locations. For example a lens can replace window 22 and source 10 would be placed between mirror 14 and the shown location of mirror 13. Mirror 13 and baffle 16 would be deleted. Increased optical efficiency can be achieved by replacing window 23 with a field lens. Detector focusing mirrors 39, 45, and 71 could also be replaced with lenses. As anyone skilled in the art will recognize, the selection between reflective and transmissive optics is controlled by tradeoffs between cost and performance and will vary with different embodiments.

Figure 2:
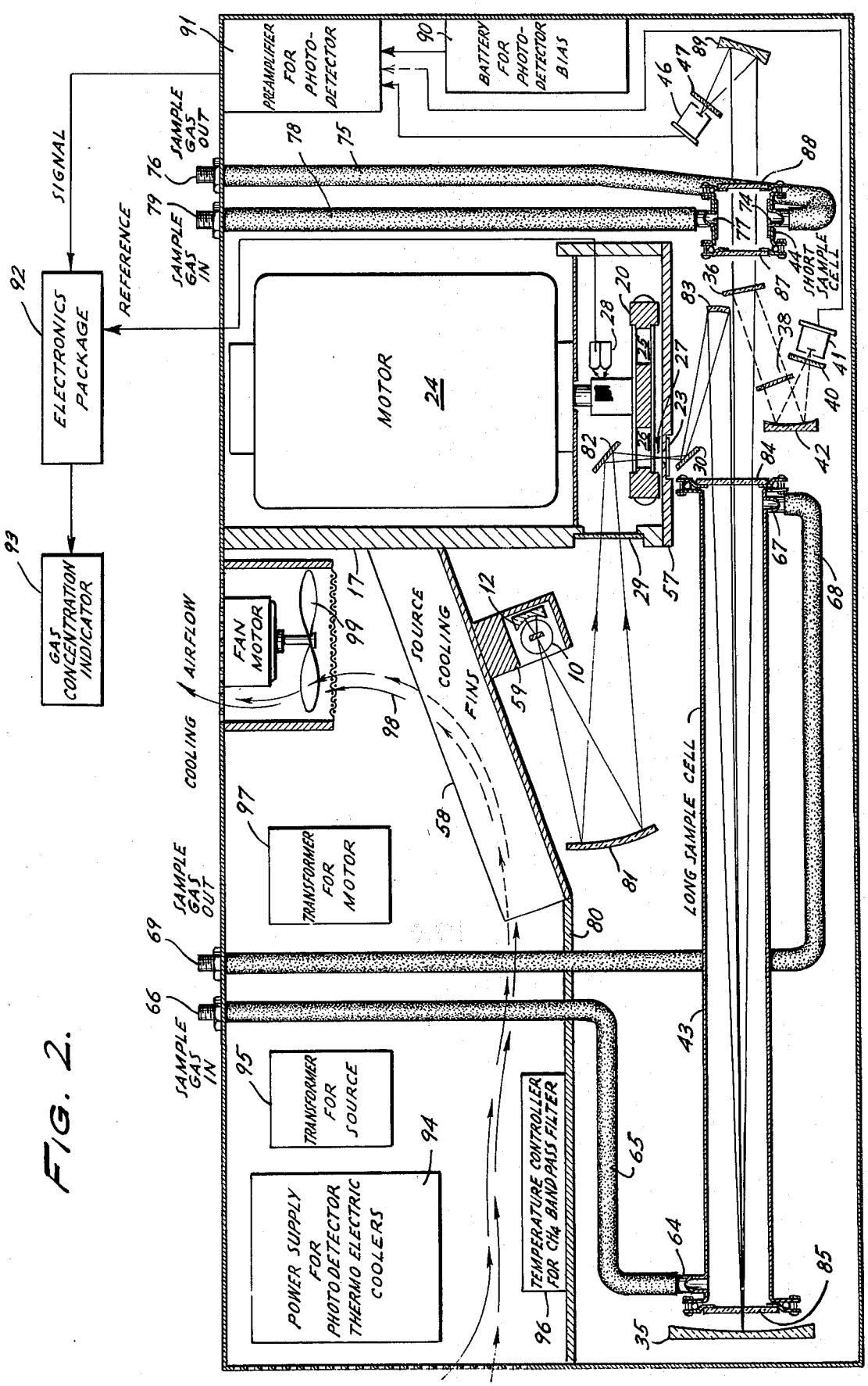
FIG. 2 is an alternative embodiment of the FIG. 1 device, showing a different optical system and simplified electronics.

FIG. 2 shows an alternate embodiment of the invention. Where elements are the same they carry the number shown in FIG. 1. The measurement instrument shown in FIG. 2 operates in the following manner.

Radiant energy source 10 is contained inside lamp mount 59. Lamp mount 59 is desirably isolated thermally from the instrument baseplate and is provided with cooling fin unit 58. Most of the radiant energy from source 10 that is not intercepted by mirrors 12 or 81 is intercepted and absorbed by mount 59. Mount 59 is attached to source cooling fins 58 which are in turn attached to the instrument baseplate through a thermal insulator (not shown). Fan 99 draws a stream of cooling air 98 through the source cooling fins on unit 58 to prevent the source from significantly heating the remainder of the instrument. Air stream 98 circulates only through the portion of the instrument that generates a significant amount of heat. The portion of the instrument that contains the optical path is isolated from the moving airstream by the walls 80 and 17 and the source cooling fin unit 58. The air within the optical path taht is not within a sample cell must remain stagnant for optimum performance of the instrument. Otherwise, variations in the concentration of the gases being detected within the ambient air would result in erroneous indications of the concentrations of the gases present within the sample cells. A fixed concentration of gas within the ambient air can be zeroed out by an electronic adjustment when no gas is present within the sample cell. Four other sources of heat are cooled by airstream 98. They are listed in descending order of heat contribution. An a.c. to d.c. power supply 94 powers the thermoelectric coolers of the photodetectors 41 an1 46. The source 10 is powered by a voltage reduction transformer 95. The very narrow bandpass filter 38 for the methane detection system is heated and maintained at a stable temperature by a temperature controller 96. The tuning of filter 38 is a function of both the temperature of the filter and the angle of incidence of the radiant energy beam. The heat generated by synchronous motor 24 is reduced by operating the motor at a reduced voltage that is supplied by transformer 97.

Source 10 and mirror 12 operate as described in FIG. 1. The illumination from focusing mirror 81 is directed through window 29 and then by flat mirror 82 through selector cell 20 and onto aperture 27 and through window 23. These too operate as in FIG. 1. Selector cell 20 which is contained inside dust shield 57 operates as was shown in FIG. 1. The radiant energy exiting by way of window 23 from dust shield 57 is reflected by flat mirror 30 onto focusing mirror 83 which is positioned to image aperture 27 onto mirror 35 as shown by the solid lines. Spherical mirror 35 is mounted with its axis parallel to sample region 43 and its radius of curvature is selected to form an image of mirror 83 on reflector 36. Since the input illumination to long sample cell 43, which is similar to sample cell 34 of FIG. 1, is slightly off axis, the emergent radiant energy is equally off axis as shown. The long sample cell 43 is connected to instrument gas inlet and outlet fittings 66 and 69 by means of ports 64 and 67 along with flexible hoses 65 and 68. Sample cell 43 is closed by windows 84 and 85 and operates as does sample cell 34 of FIG. 1.

The radiant energy reflected from reflector 36 is directed through filter 38 to focusing mirror 42 which illuminates photodetector 41 through filter 40. These elements operate as described in conection with FIG. 1 and the output of photodetector 41 can be connected as shown by the dashed arrow to the input of preamplifier 91. Photodetector bias is provided by means of battery 90. Electronics package 92 processes the electrical signal along with the reference signal from 28 to produce an output on indicator 93.

The radiant energy passed by reflector 36 is applied through cell 44 to focusing mirror 89 which illuminates photodetector 46 through filter 47. These elements also operate as described in connection with FIG. 1. The output of photodetector 46 is connectable, as shown by the solid arrow to preamplifier 91 whereupon the signal is processed in electronics package 92 and displayed on indicator 93. Thus the output of either of the photodetectors 46 or 41 can be connected to the electronic system.

Short sample cell 44 is a separate unit located between reflector 36 and mirror 89. Except for its short length, cell 44 is constructed like cell 43. Its inlet port 77 is connected by flexible hose 78 to the sample gas inlet fitting 79 while outlet port 74 is connected by flexible hose 75 to outlet fitting 76. The two sample cells 43 and 44 are not used simultaneously. Where high concentrations are to be measured, cell 43 is drained of gas of the species to be measured and gas flow is applied to cell 44. Clearly either sample cell will be operative for measurements taken using photodetector 46 but photodetector 41 is useful only with sample cell 43.

The electronic operation and measurement technique is the same as was described for FIG. 1 except that only one reading at a time can be taken.

EXAMPLE

A gas measurement device was constructed as shown in FIG. 2. The gas cell 20 was made to have chambers about one cm long. Chamber 26 was filled with a mixture of carbon monoxide at about 0.5 atmosphere (partial pressure) and methane at about 0.5 atmosphere (partial pressure). Chamber 25 was filled with nitrogen (which does not absorb at the wavelengths of interest) and the window of cell 20 associated with chamber 25 was provided with a light metal coating to provide an attenuation of about 30 percent by methods taught in application Ser. No. 476,373. Dichroic reflector 36 was designed to reflect radiant energy near 3.3 micrometers and to pass energy near 4.6 micrometers. Filter 47 was selected to have a passband near 4.6 micrometers and filter 40 was selected to have a passband near 3.3 micrometers. Filter 38 is selected to have a very narrow passband centered at a wavelength of 3.315 micrometers. Filter 38 was constructed to pass a somewhat longer wavelength and then angled away from perpendicular incidence to tune it to exactly the correct wavelength. Filter 38 was heated to about 40°C. The temperature of filter 38 is maintained at a constant value by a heater (not shown) driven by temperature controller 96. Heating the filter tunes it to a slightly longer wavelength than the passband at room temperature. Controlling the temperature of filter 38 makes the methane detection system insensitive to fluctuations in the ambient temperature of the device. It is not necessary to control the temperature of filter 47 that sets the spectral region used with the carbon monoxide detector system. This is because the filter passband is wide enough to be relatively insensitive to normally encountered variations in the ambient temperature of the device.

The photodetectors 41 and 46 were of the photoconductive lead selenide type, thermoelectrically cooled to −25°C. Sample cell 43 was made 37 cm long and sample cell 44 was 2 cm long. Thus the long sample cell had an effective length of 74 cm. The device shown in FIG. 2 was originally constructed without the short sample cell 44. Sensitivity data was taken for both CO (carbon monoxide) and $CH_4$ (methane) without the short sample cell. The short sample cell was then installed to accommodate high concentration values. The system shown in FIG. 2 allowed the measurement of high concentrations of CO by placing the sample in short cell 44. For the system illustrated, the signal output was proportional to the product of the sample concentration and the sample path length as long as the sample temperature and pressure remained constant. The following table gives a summary of the performance of the system of FIG. 2 in terms of measurement range and discrimination.

|  | CO | | $CH_4$ |
| --- | --- | --- | --- |
|  | Long Sample Cell | Short Sample Cell |  |
| Sample Cell Path Length | 74 cm | 2 cm | 74 cm |
| Minimum detectable gas concentration* | 0.6 ppm | 20 ppm | 0.6 ppm |
| Maximum measurable concentration | 3,000 ppm | 100,000 ppm | 1,500 ppm |
| Discrimination against other gases:** | | | |
| $H_2O$ | >25,000:1 | >25,000:1 | >7,000:1 |
| $CO_2$ | >100,000:1 | >100,000:1 | >2,000,000:1 |

|  | CO | | CH₄ |
|---|---|---|---|
|  | Long Sample Cell | Short Sample Cell |  |
| CO*** |  |  | >230,000:1 |
| CH₄ | NSI | NSI |  |
| C₂H₂ | NSI | NSI | >20,000:1 |
| NO | NSI | NSI | >120,000:1 |
| C₂H₄ | NSI | NSI | >190:1 |
| Zero drift after warm-up | <1 ppm/hr | <5 ppm/hr | <1.5 ppm/hr |
| Sensitivity drift after warm-up | <0.1 ppm/hr | <0.5 ppm/hr | <0.1 ppm/hr |

NSI = No significant interference.

*These readings represent peak-to-peak values electronically time averaged over a 1-second interval.

**A discrimination ratio of $x$:1 means that it takes $x$ ppm of an interfering gas to produce an output that corresponds to 1 ppm of the gas being measured. The discrimination ratios for hydrocarbons when measuring methane are based on parts-per-million-of-carbon in the two gases.

***CO used in test was probably contaminated with hydrocarbons.

The data in the table were taken with the tungsten filament source 10 illustrated in the drawings and described in connection with FIG. 1. Changing the source to a ceramic tube that is heated by a hot wire inside the tube was found to increase the CO detectivity at the expense of the CH₄ detectivity. With this source mirror 12 is not used. The source mounts to a source cooling fins 58 with a mount similar to mount 59. With the ceramic source, the minimum detectable gas concentrations were 0.3 ppm and 11 ppm for CO for the long and short sample cells, respectively, and about 1.0 ppm for CH₄ for the long sample cell. The performance of the system for the other measured parameters did not change significantly when the sources were changed.

It was also found that if the tungsten filament source 10 were replaced with a Nernst glower the detectivity of the system to both CO and CH₄ could be improved by a factor of 2 to 3. Unfortunately, a Nernst glower is very fragile, difficult to mount to the cooling fins, and gives off about twice as much heat as either the tungsten filament source or the ceramic tube source that is heated by an internal hot wire. The Nernst glower also has a relatively short operational lifetime and requires a current limited power source, such as a ballast, whereas either of the other two sources can be operated from a transformer. For these reasons, a Nernst glower source would only be used in applications requiring the smallest possible minimum detectable gas concentrations. The minimum detectable gas concentrations can also be reduced by using liquid nitrogen-cooled photodetectors rather than thermoelectrically-cooled photodetectors.

If greater discrimination is desired, the gas cell 20 can be modified by removing the attenuator described and replacing the nitrogen fill in chamber 25 with a mixture of carbon monoxide and methane at suitably high partial pressures. In addition, more precise and sharper tuning of filters 38, 47 and 73 will improve discrimination.

Two embodiments of an instrument have been described for measuring a plurality of gas components in a sample and means have been described for extended measurement range. A specific example of such an instrument and its performance has been set forth. Various modifications and equivalents will occur to a person skilled in the art. For example while the use of infra-red radiant energy is shown, visible and ultra-violet radiant energy can be employed. Also while the embodiments illustrated use the rotating gas cell the fixed cell construction shown in U.S. Pat. No. 3,813,146 could be employed to practice the invention. Accordingly, it is intended that the invention be limited only by the following claims.

We claim:

1. A gas analyzer for simultaneously analyzing a plurality of gas species, said analyzer comprising:
    a source of radiant energy;
    means for forming radiant energy from said source into a beam;
    means for passing said beam alternately through a pair of radiant energy transmissive chambers, at least one of said chambers containing a plurality of gas species, one gas species for each gas species to be analyzed, and each gas contained by said chamber at a partial pressure selected to result in suitable radiant energy absorption lines;
    means for passing said beam through a sample region in which said analyzing is to take place;
    means for separating said beam into a plurality of divergent paths, said paths including at least one path for each of said gas species of said plurality;
    means for confining the radiant energy in each of said paths to a particular portion of the radiant energy spectrum;
    means for converting said radiant energy in each of said paths to an electrical signal; and
    means for electrically evaluating the modulation products of each signal of each of said paths and displaying the results of said evaluation.

2. The analyzer of claim 1 wherein said chambers are contained in a rotating gas cell structure.

3. The analyzer of claim 1 wherein said chambers are fixed and a light beam alternator directs said beam alternately through said chambers.

4. The analyzer of claim 1 wherein said means for separating includes dichroic reflector means.

5. The analyzer of claim 1 wherein at least one of said gas species is simultaneously analyzed in a plurality of different length sample regions to extend the measurement range of said analyzer.

6. The analyzer of claim 2 wherein said cell includes means for chopping said beam at a rate substantially higher than the rate of said alternation.

7. A gas analyzer for simultaneously analyzing the methane and carbon monoxide content present in a sample gas region, said analyzer comprising,
    a source of infra-red radiant energy emitting substantial energy over at least the 3 to 5 micrometer region of the radiant energy spectrum,
    means for forming said radiant energy into a beam,
    means for passing said beam through a rotating gas cell, said cell including at least two chambers that are alternately inserted into said beam as said cell rotates, at least one chamber of said cell containing a mixture of methane and carbon monoxide at a pressure that produces suitable spectral absorption lines in said 3 to 5 micrometer region, means for passing said beam through a sample region in which said measurement is to be taken, means for separating said modulated beam into separate components centered at about 3.3 micrometers and about 4.6 micrometers, means for detecting the energy in said 3.3 micrometer beam component, electrically processing the modulation products of the detected signal, and displaying the results on a methane concentration indicator, and means for detecting the energy in said 4.6 micrometer beam component, electrically processing the modulation products of the detected signal, and displaying the results on a carbon monoxide concentration indicator.

8. The analyzer of claim 7 wherein said 3.3 micrometer beam component is additionally passed through a narrow band filter tuned to a wavelength of 3.315 micrometers.

9. The analyzer of claim 7 wherein two substantially different length sample regions are employed and the carbon monoxide concentration is measured simultaneously in both to extend the measurement range for carbon monoxide.

10. The analyzer of claim 7 wherein said cell includes means for chopping said beam at a rate substantially higher than the rate of said alternation.

* * * * *